US007769537B2

(12) United States Patent
Gates et al.

(10) Patent No.: US 7,769,537 B2

(45) Date of Patent: Aug. 3, 2010

(54) AUXILIARY LOCOMOTIVE ENGINE WARMING SYSTEM

(75) Inventors: Bradley R. Gates, Erie, PA (US); Brian D. Gross, Westfield, NY (US); Kevin W. O'Neal, Erie, PA (US)

(73) Assignee: Power Drives, Inc, Buffalo, NY (US)

( * ) Notice: Subject to any disclaimer, the term of this patent is extended or adjusted under 35 U.S.C. 154(b) by 182 days.

(21) Appl. No.: 12/150,838

(22) Filed: May 1, 2008

(65) Prior Publication Data

US 2009/0272353 A1 Nov. 5, 2009

(51) Int. Cl.
*G06F 19/00* (2006.01)
*B60H 1/03* (2006.01)

(52) U.S. Cl. ................................ 701/113; 123/142.5 E

(58) Field of Classification Search ................. 701/113; 123/142.5 R, 142.5 E, DIG. 8, 198 D, 196 AB, 123/179.19, 41.33
See application file for complete search history.

(56) References Cited

U.S. PATENT DOCUMENTS

| | | | | |
|---|---|---|---|---|
| 3,758,031 | A | 9/1973 | Moran | |
| 4,192,274 | A | 3/1980 | Damon | |
| 4,195,288 | A * | 3/1980 | Morton | 340/539.1 |
| 4,424,775 | A | 1/1984 | Mayfield, Jr. et al. | |
| 4,711,204 | A | 12/1987 | Rusconi | |
| 4,935,689 | A * | 6/1990 | Fujikawa et al. | 322/1 |
| 6,470,844 | B2 | 10/2002 | Biess | |
| 6,636,798 | B2 * | 10/2003 | Biess et al. | 701/112 |
| 6,786,209 | B2 | 9/2004 | Stewart | |
| 6,928,972 | B2 | 8/2005 | Beiss et al. | |
| 6,945,207 | B2 | 9/2005 | Biess et al. | |
| 7,081,811 | B2 * | 7/2006 | Johnston et al. | 340/449 |
| 2002/0189564 | A1 * | 12/2002 | Biess et al. | 123/142.5 R |
| 2004/0140366 | A1 | 7/2004 | Uzkan | |
| 2005/0199210 | A1 | 9/2005 | Biess et al. | |

FOREIGN PATENT DOCUMENTS

| | | |
|---|---|---|
| GB | 2409262 | 6/2005 |
| WO | WO 02/087950 | 11/2002 |

OTHER PUBLICATIONS http://www.kimhotstartcom/kimhotstart/uploads/documents/products/ddhs_junior_info_sheet.pdf (last accessed Jul. 31, 2008).
http://kimhotstart.com/kimhotstart/sub.aspx?id=15566 (last accessed Jul. 31, 2008).

* cited by examiner

*Primary Examiner*—Mahmoud Gimie
(74) *Attorney, Agent, or Firm*—Simpson & Simpson, PLLC

(57) ABSTRACT

An auxiliary engine warming system for a primary engine in a diesel locomotive including: a modular engine assembly including an auxiliary diesel engine, the assembly displaceable as a unit from and to a frame for the engine warming system; an auxiliary fuel tank including a fuel line detachably connected to the auxiliary engine and including a first fitting detachably connectable to a first fuel line for a fuel tank for the diesel; at least one temperature sensor interfacable with the diesel locomotive and arranged to monitor at least one temperature condition for the diesel locomotive; and an emergency dialer for automatically dialing a preprogrammed number and transmitting an alert message in response to an alarm signal from the at least one temperature sensor.

10 Claims, 6 Drawing Sheets

AUXILIARY LOCOMOTIVE ENGINE WARMING SYSTEM

FIELD OF THE INVENTION

This invention relates to locomotives, and more specifically to an improved auxiliary locomotive engine warming system.

BACKGROUND OF THE INVENTION

Traditionally, when temperatures approach freezing, locomotives are left idling to keep their diesel engines heated, to both prevent damage from freezing and to facilitate a re-start. This includes keeping locomotives running over entire weekends, or in some cases, even longer periods of time, as necessary. If the diesel engines are not kept warm, the engine blocks may crack from freezing, or the locomotive may not be able to start properly. Even while idling, diesel engines consume a substantial amount of fuel, especially in the case of large locomotive engines. Moreover, the rising costs of diesel and other fuels, along with trends towards making products more eco-friendly, have drastically increased the desirability of reducing fuel consumption whenever possible. Therefore, auxiliary warming systems have been known in the art that connect to the coolant system of the engine, heat the coolant, and subsequently pump the coolant throughout the coolant system.

Unfortunately, locomotives are not designed to accommodate auxiliary systems; therefore there is limited space to install such systems in current locomotives. If an auxiliary system is installed in a small space, or in a space surrounded by other locomotive components, access may be limited to the elements included in the auxiliary system. This will significantly hinder any maintenance or other repair work that must be done on the auxiliary system. Furthermore, the installation can be quite difficult since coolant, fuel, oil, and other supply lines must connect between the locomotive and the engine warming systems. Standard inputs and outputs on fuel tanks, coolant heaters, auxiliary engines and the like may not be appropriately sized to connect to the corresponding systems and components in the locomotive, but instead may require special fittings or adaptors. Thus, it is currently quite cumbersome, time consuming, and therefore costly to install an engine warming system in a diesel locomotive.

Thus, what is needed is an auxiliary engine warming system for locomotives that can fit into the space available on a locomotive proximate to the locomotive's engine, install quickly and easily into the locomotive, and provide an operator with sufficient access to all components of the engine warming system for maintenance or other repairs.

BRIEF SUMMARY OF THE INVENTION

The present invention generally comprises an auxiliary engine warming system for a primary engine in a diesel locomotive including: a modular engine assembly including an auxiliary diesel engine, the assembly displaceable as a unit from and to a frame for the engine warming system; an auxiliary fuel tank including a fuel line detachably connected to the auxiliary engine and including a first fitting detachably connectable to a first fuel line for a fuel tank for the diesel; at least one temperature sensor interfacable with the diesel locomotive and arranged to monitor at least one temperature condition for the diesel locomotive; and an emergency dialer for automatically dialing a preprogrammed number and transmitting an alert message in response to an alarm signal from the at least one temperature sensor.

In a preferred embodiment, the engine assembly includes a mounting plate, the auxiliary engine is secured to the mounting plate, the mounting plate is slidingly engagable with at least one slot in a frame of the auxiliary engine warming system for insertion into and removal from the frame, and the plate is detachably fastened to the frame by a plurality of threaded fasteners. In another preferred embodiment, the system includes a vibration dampening means for reducing a transmission of vibrations from the auxiliary engine to the locomotive. In a further preferred embodiment, the engine assembly includes a generator mechanically coupled to an output of the auxiliary engine. In yet another preferred embodiment, the system includes a coolant heater with a second fitting detachably connectable to a second fuel line for the fuel tank for the diesel. In one embodiment, the first and second fittings are the only fittings in the system connectable between the system and the fuel tank for the diesel locomotive. In another embodiment, the first and second fittings are the only fittings in the system necessary to supply fuel to the system.

In a preferred embodiment, the system includes a controller connected to the at least one temperature sensor and the dialer and the at least one sensor includes a coolant temperature sensor and oil temperature sensor.

The present invention generally comprises an auxiliary engine warming system for a primary engine in a diesel locomotive including an auxiliary diesel engine, a generator mechanically coupled to the auxiliary engine, a temperature sensor operatively arranged to measure a temperature of a coolant in the primary engine of the locomotive, an emergency dialer for automatically dialing a preprogrammed number and transmitting an alert message when the temperature sensor measures a temperature below a minimum limit temperature of the coolant, and a coolant pump for pumping the coolant from the primary engine through the coolant heater, and a coolant heater for warming the coolant as the coolant is pumped through the coolant heater and back into the primary engine.

In one embodiment the auxiliary engine warming system further comprises a mounting plate, wherein the auxiliary engine is secured to the mounting plate, and wherein the mounting plate is operatively arranged to slidingly engage with at least one slot in a frame of the auxiliary engine warming system. In another embodiment, the engine warming system includes a vibration dampening means for reducing a transmission of vibrations from the auxiliary engine to the locomotive. In yet another embodiment, the current invention includes an auxiliary fuel tank arranged between a primary fuel tank of the locomotive and the auxiliary engine.

In another embodiment, the present invention includes a generator mechanically coupled to an output of the auxiliary engine for generating electric current. In another embodiment, the auxiliary engine warming system includes an oil pump for circulating oil in an oil sump of the primary engine through the primary engine. In yet another embodiment, the auxiliary engine warming system further comprises a battery means for providing electricity necessary to start the auxiliary engine and emergency dialer.

It is a general object of the present invention to provide an auxiliary engine warming system for maintaining an appropriate temperature in a locomotive engine, and thus, to prevent damage to the locomotive engine.

It is a further object of the present invention to provide an auxiliary engine warming system as identified above which can fit into the space available on a locomotive proximate to the locomotive's engine, install quickly and easily into the locomotive, and provide an operator with sufficient access to all components of the engine warming system for maintenance or other repairs.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it should be understood that this invention is not limited to the particular methodology, materials and modifications described and as such may, of course, vary. It should also be understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
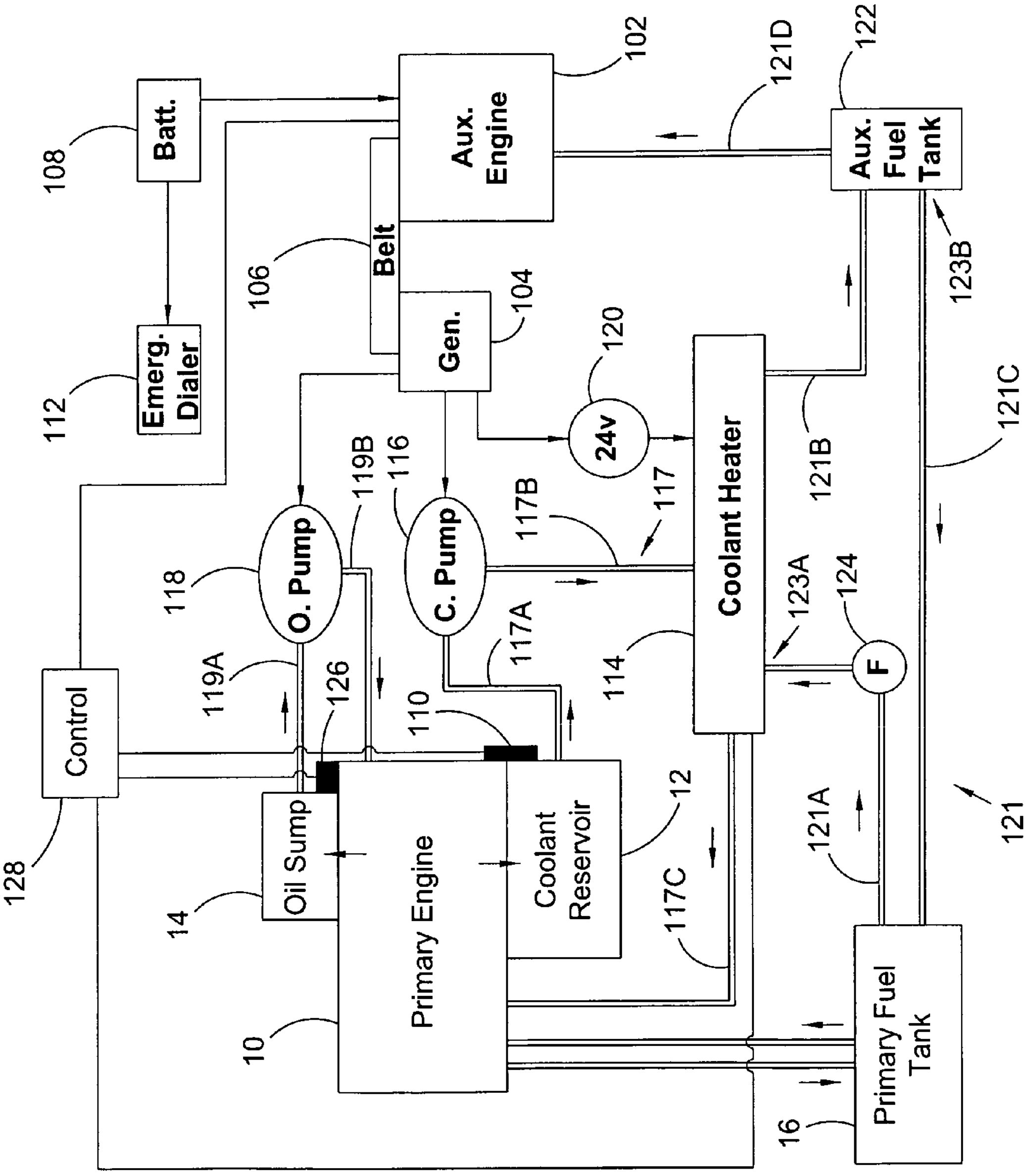
FIG. 1 is a schematic block diagram of a current invention engine warming system.

Referring now to the drawings, FIG. 1 is a schematic of engine warming system 100 installed in a locomotive. The locomotive can be any locomotive known in the art, which includes primary engine 10, coolant reservoir 12, oil reservoir, or sump, 14, and primary fuel tank 16. In a preferred embodiment, engine warming system 100 includes auxiliary engine 102 coupled to generator 104 by any means known in the art, for example, belt 106. It should be understood that generator 104 creates direct current, but an alternator could be included instead if alternating current were instead desired. Thus, by use of the word "generator," we mean any device capable of producing electric current, whether it is AC or DC. In a first embodiment the generator has a 74V output. In a second embodiment, the generator provides more electricity than needed by engine warming system 100, and is arranged to recharge a primary battery in the locomotive (not shown). Advantageously, this arrangement uses electricity produced by the generator which may otherwise be unused. Additionally, it should be understood that belt 106 could be replaced by a chain or other mechanical coupling means that would connect the output of engine 102 to generator 104.

In another preferred embodiment, engine 102 is electronically started by electricity provided by battery means 108. In one embodiment, battery means 108 is a 12V battery, such as a standard car battery. The battery also supplies power for emergency dialer 112. Emergency dialer 112 is configured to communicate with coolant temperature sensor 110 via control unit, or controller 128. The emergency dialer can be any emergency dialer known in the art. In one embodiment, the dialer is a standard cellular telephone, or some other equivalent or similar device, which utilizes cellular, satellite, or similar wireless communication technology. Temperature sensor 110 is arranged to measure the temperature of primary engine 10, and/or the temperature of coolant in primary engine 10. In typical locomotive applications, the coolant is primarily water, which may also contain some additives. If the temperature sensor reports a temperature below a preset minimum value, control unit 128 electronically commands emergency dialer 112 to dial a preset phone number for a locomotive operator. The phone number is preprogrammed into the emergency dialer during the installation of the engine warming system, and is generally for the operator, foreman, or manager responsible for the particular locomotive. The minimum value is selected as a temperature at which damage to the locomotive's engine is imminent, which is probably about 10-15 degrees Fahrenheit above freezing (about 40-50 degrees Fahrenheit), but it should be understood that the minimum temperature can be any desired value. After dialing, the emergency dialer then transmits an emergency message, in the form of text or a voice recording, to the operator informing the operator that the temperature of the coolant in the locomotive has dropped below the acceptable minimum level. The operator then has the option to physically go to the locomotive and turn on engine warming system 100. In a further preferred embodiment, similar to an automatic car starter, the control unit is programmed to electronically start auxiliary engine 102 and heater 114 when the temperature sensor indicates a temperature below the minimum value.

In one embodiment, the control unit monitors the engine warming system for any faults or errors. For example, the control unit communicates with sensors or probes (not shown) to determine if sufficient power is being generated by generator 104, sufficient fluid flow is occurring through coolant pump 116, if the level of fuel is sufficient in locomotive fuel tank 16 and auxiliary fuel tank 122, if the temperature sensors stop responding, or the like. In another embodiment, if the control unit senses a fault, problem, or error, the unit is programmed to instruct emergency dialer 112 to dial the preset numbers to inform the locomotive operators that the engine warming system is encountering a problem and requires immediate attention.

Coolant heater 114, pump 116 and oil pump 118 receive power from generator 104. Any suitable heater known in the art can be used for heater 114. In a preferred embodiment, the heater is a 24V diesel fueled coolant heater, such as manufactured by Webasto Product N.A., Inc, which passes electrical energy through a spark plug to ignite fuel passing by the spark plug to produce a flame which is maintained with a supply of diesel fuel. The coolant heater generally has an inner chamber for containing the flame, and an outer shell for the coolant to flow through while absorbing the heat given off by the flame. In another preferred embodiment DC-DC converter 120 is used to convert the generator's 74VDC output to 24VDC, as required by heater 114. It can be seen by examining coolant loop 117 (coolant lines 117A, 117B, and 117C, collectively) that pump 116 draws coolant from coolant reservoir 12 via coolant line 117A and pumps the coolant into the outer shell of coolant heater 114 via coolant line 117B, where the coolant is heated, for example, by a flame within the heater. The heated coolant is discharged into coolant line 117C, which delivers the heated coolant into primary engine 10, before eventually being drawn back into pump 116 to repeat the cycle.

Likewise, oil is drawn by pump 118 via oil line 119A from oil reservoir 14 and pumped through primary engine 10 by oil line 119B. The oil is kept warm simply by passing through engine 10 and absorbing residual heat, which is provided by the warm coolant pumping through coolant loop 117. Thus, no additional heaters should be required to sufficiently warm the oil in the locomotive.

In a preferred embodiment, heater 114 is fueled directly by the locomotive's primary fuel tank 16. In one embodiment, in the operation of heater 114, an excess of diesel fuel is sprayed over the igniter in the heater to maintain a flame. The extra fuel is stored in auxiliary fuel tank 122. Auxiliary fuel tank 122 supplies fuel to keep secondary engine 102 in operation. In another preferred embodiment, auxiliary fuel tank 122 contains a spillway (not shown), or is otherwise arranged to discharge any fuel over a maximum level back into primary fuel tank 16. In a further preferred embodiment, fuel filter 124 is located between primary fuel tank 16 and heater 114. Fuel loop 121 (fuel lines 121A, 121B, 121C, and 121D, collectively) can be seen originating in locomotive fuel tank 16, traveling through fuel line 121A to heater 114, with the excess fuel exiting the heater and flowing to auxiliary fuel tank 122 via fuel line 121B, where excess fuel in the auxiliary fuel tank flows back to the locomotive fuel tank via fuel line 121C, while a portion of the fuel is supplied via fuel line 121D to auxiliary engine 102 to keep the auxiliary engine in operation.

In one preferred embodiment, system 100 includes temperature sensors 110 and 126. Temperature sensor 110 is located proximate the primary engine and the coolant reservoir for measuring the temperature of the coolant. In one embodiment, sensor 126 also is located proximate the primary engine and oil reservoir for measuring the temperature of the oil. The sensors communicate with control unit 128. Specifically, the control unit monitors the temperatures of the oil and coolant. Thus, similar to input from temperature sensor 110, if the temperature of the oil drops below a preset limit value, the control unit instructs emergency dialer 112 to dial a preset number, and transmit the alert message. Once again, the preset number can be for a locomotive operator, and the message will indicate to the operator that engine warming system 100 must be activated in order to maintain a temperature over the minimum value. In another embodiment, the control unit, in response to a low oil temperature signal from sensor 126, electronically triggers secondary engine 102 to start in addition to, or in lieu of, dialing the operator. Additionally, the control unit instructs the emergency dialer to call the preset number if the control unit detects an electronic or mechanical failure in the system, such as if a valve cannot open, the secondary engine cannot start, the alternator stops generating sufficient electricity, or the like.

Figure 2:
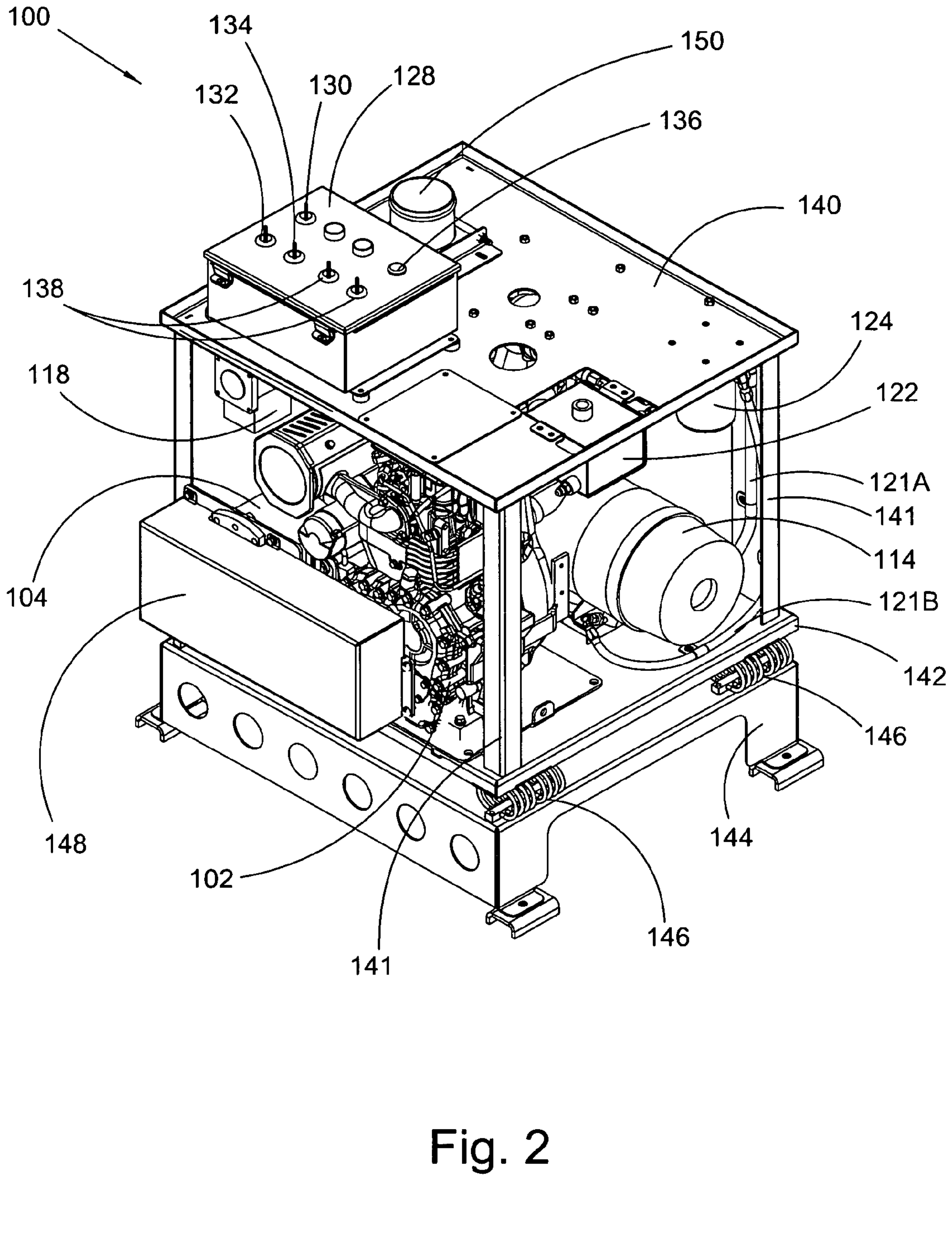
FIG. 2 is a perspective view of the engine warming system shown in FIG. 1.

FIG. 2 shows a perspective view of engine warming system 100. The following should be viewed in light of FIGS. 1 and 2. In a preferred embodiment, the engine warming system includes top plate 140 connected by support beams 141 to base plate 142, which sits atop base 144. Top plate 140, support beams 141, base plate 142, and base 144 taken together generally comprise a rigid frame or housing for the engine warming system. It should be understood that system 100 is not limited to the frame or housing shown and that other configurations for a frame or housing are included in the spirit and scope of the claimed invention. In another preferred embodiment, vibration dampening means 146 is located between base plate 142 and base 144 for reducing a transmission of vibrations from auxiliary engine 102 to the locomotive. Vibration dampening means 146 are groups of resilient, spring-like, curved elements, as shown, arranged to allow a small degree of relative movement between base 144 and base plate 142, while still maintaining a generally rigid frame for the engine warming system. By reducing the amount of vibration transferred to the locomotive, it is possible to install the engine warming system in a location proximate to sensitive equipment, where the engine warming system may not otherwise be installed. It should be understood that system 100 is not limited to the dampening means shown and that other configurations for a frame or housing are included in the spirit and scope of the claimed invention. Base 144 can either be permanently secured to the locomotive by welds, rivets, or the like, or detachably secured to the locomotive using bolts or the like.

In one embodiment, control unit, or controller 128 is located on top plate 140 of the system so that it is accessible by an operator, although it should be understood that other locations for the control unit are possible. In a preferred embodiment, control unit 128 includes master switch 130 for enabling or disabling power to the engine warming system, specifically by having selectable on and off positions. Control unit 128 also has switch 132 to individually start secondary engine 102 and switch 134 for starting heater 114. In another embodiment, switches 132 and 134 only function if the master switch is put in the on position, because otherwise no power would be deliverable to the system. The switches can be any suitable switches known in the art, including simple mechanical switches to complete or disconnect electric circuits. In a further embodiment, indicator light 136 illuminates to indicate when the master switch is set in the on position, and therefore indicate that the system is receiving power and ready to be started. In yet another embodiment, additional switches, such as switches 138, are structurally similar to switches 130, 132, 134, and could be used to control power to the emergency dialer, pumps, or any other component as desired.

In a preferred embodiment, the remaining components in engine warming system 100 are located below the control unit. Auxiliary engine 102 is shown next to generator 104 and heater 114. Safety cover 148 generally houses belt 106, which is hidden behind and protected by the safety cover. Heater 114 is shown connected to input fuel line 121A and output fuel line 121B. The input fuel line pumps fuel from the locomotive's primary fuel tank 16 to heater 114, with the fuel passing through filter 124 before arriving at the heater.

Auxiliary fuel tank 122 is also located between auxiliary engine 102 and heater 114 for supplying excess fuel from the heater into the auxiliary engine. The auxiliary fuel tank is fabricated with custom inlets and outlets and it is connected to the auxiliary engine and coolant heater before the engine warming system is installed in a locomotive. Advantageously, this enables auxiliary fuel tank 122 to act as a hub so that standard sized fuel lines can be used from both the auxiliary engine and the locomotive's fuel tank to easily connect all fuel lines in fuel loop 121 without the need for any fittings or adaptors.

Figure 3:
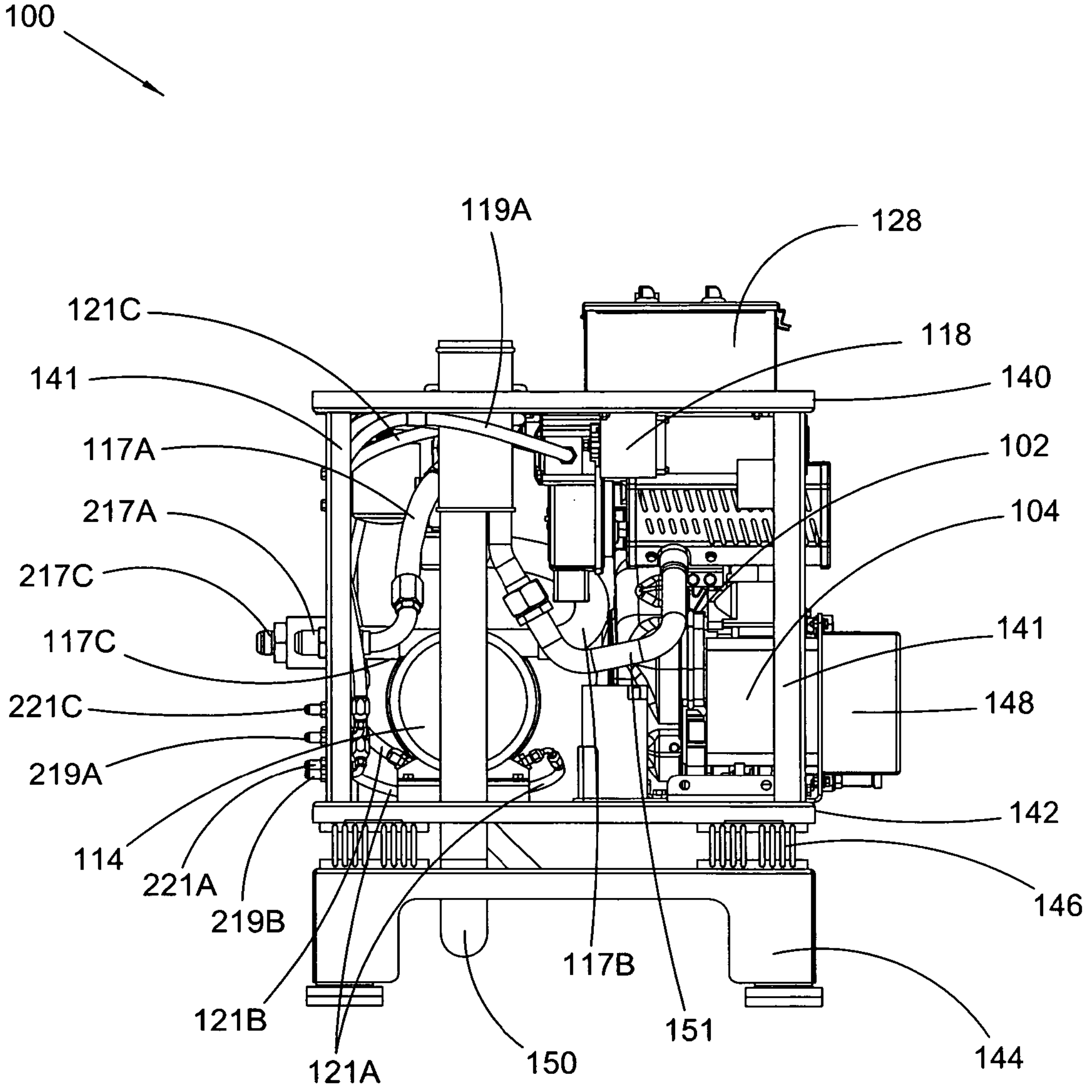
FIG. 3 is a left side view of the engine warming system shown in FIG. 2.
Figure 5:
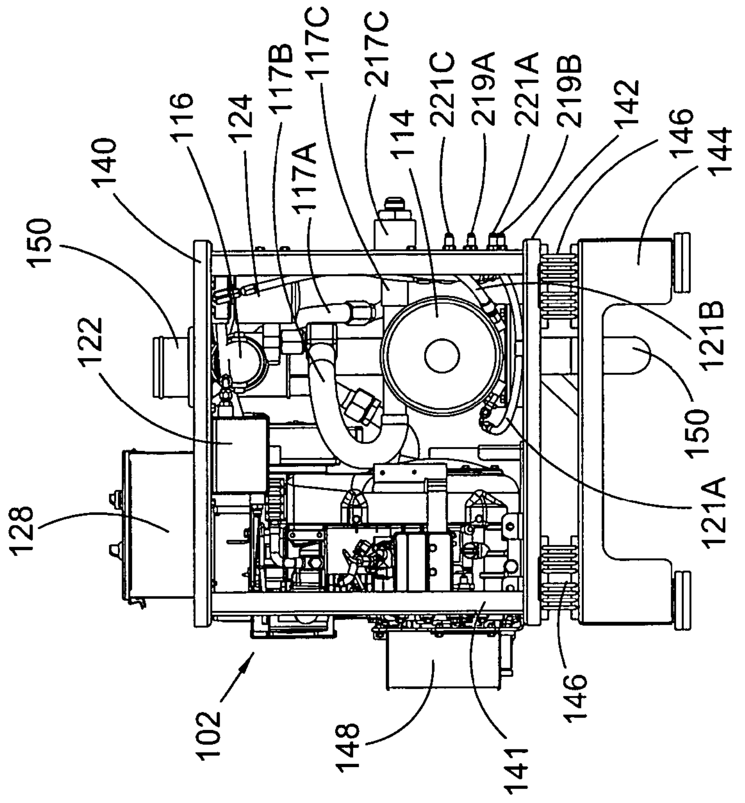
FIG. 5 is a right side view of the engine warming system of FIG. 2.
Figure 4:
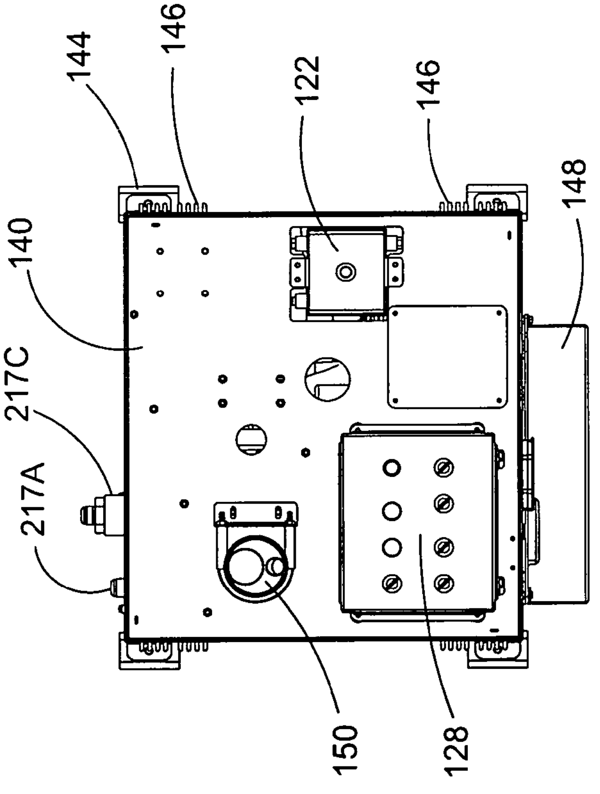
FIG. 4 is a top view of the engine warming system of FIG. 2.

The following paragraphs should be read in light of FIGS. 3, 4, and 5, which show left, top, and right views of engine warming system 100, respectively. It can be seen that auxiliary engine 102, generator 104, and heater 114 are installed on base plate 142, and located below control unit 128 on top plate 140. Exhaust pipe 150 can be seen running vertically proximate to coolant heater 114. The exhaust pipe connects to the coolant heater to enable the exhaust created by the diesel fueled flame in the heater to escape. Engine exhaust pipe 151 can be seen connecting auxiliary engine 102 to exhaust pipe 150.

A plurality of coolant, fuel, and oil lines can also be seen in FIGS. 3-5. Specifically, coolant lines 117A and 117B can be seen respectively entering and exiting pump 116, while coolant lines 117B and 117C can be seen entering and exiting coolant heater 114, respectively. Line 117A originates at quick connect coupling 217A, while line 117C terminates at quick connect coupling 217C. Similarly, it can be seen that any lines or pipes which connect to the locomotive terminate or originate in a quick connect coupling. Quick connect couplings are well known in the art for detachably securing two complimentary sections of pipe together.

Likewise, fuel lines 121A and 121B can be seen respectively entering and exiting coolant heater 114, and fuel line 121C can be seen exiting auxiliary fuel tank 122. Fuel line 121A originates at coupling 221A and fuel line 121B terminates at couple 221B. Similarly, oil lines 119A and 119B are shown entering and exiting oil pump 118, with line 119A originating at couple 219A, and line 119B terminating at couple 219B.

Since system 100 is an auxiliary system, the system is typically installed after construction of the locomotive is already complete. Therefore, there is only a limited space in the locomotive in which to install engine warming system 100, since the locomotive is not typically designed with an auxiliary warming system in mind. Thus, there may be instances where the engine warming system is installed in a small space, so that an operator has access to substantially only one side of system, with access to the other sides being blocked by pre-existing locomotive components.

Figure 6:
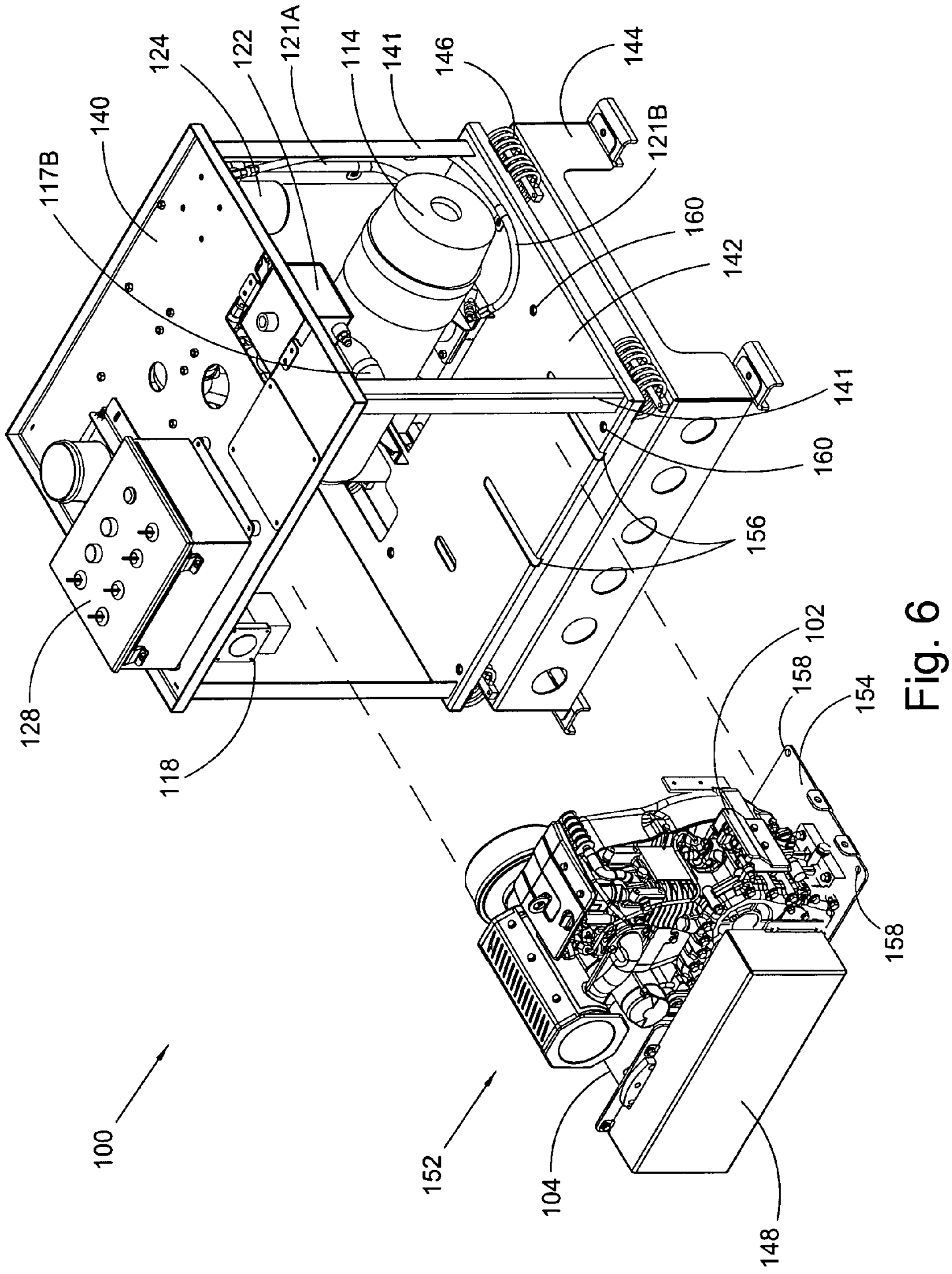
FIG. 6 is a perspective partial exploded view showing an engine assembly removed from the engine warming system shown in FIG. 2.

Thus, as shown in FIG. 6, modular engine assembly 152 is arranged so that the assembly can simply slide out of engine warming system 100 after a few bolts are undone. That is, the system includes a modular engine assembly. Engine assembly 152 includes auxiliary engine 102 coupled to generator 104 by belt 106, which is covered by safety cover 148. The engine and generator are secured to engine mounting plate 154, preferably by bolts or some other detachable securing means. Engine mounting plate 154 engages with slots 156 in base plate 142 and the mounting plate then secures to base plate 142.

Figure 7:
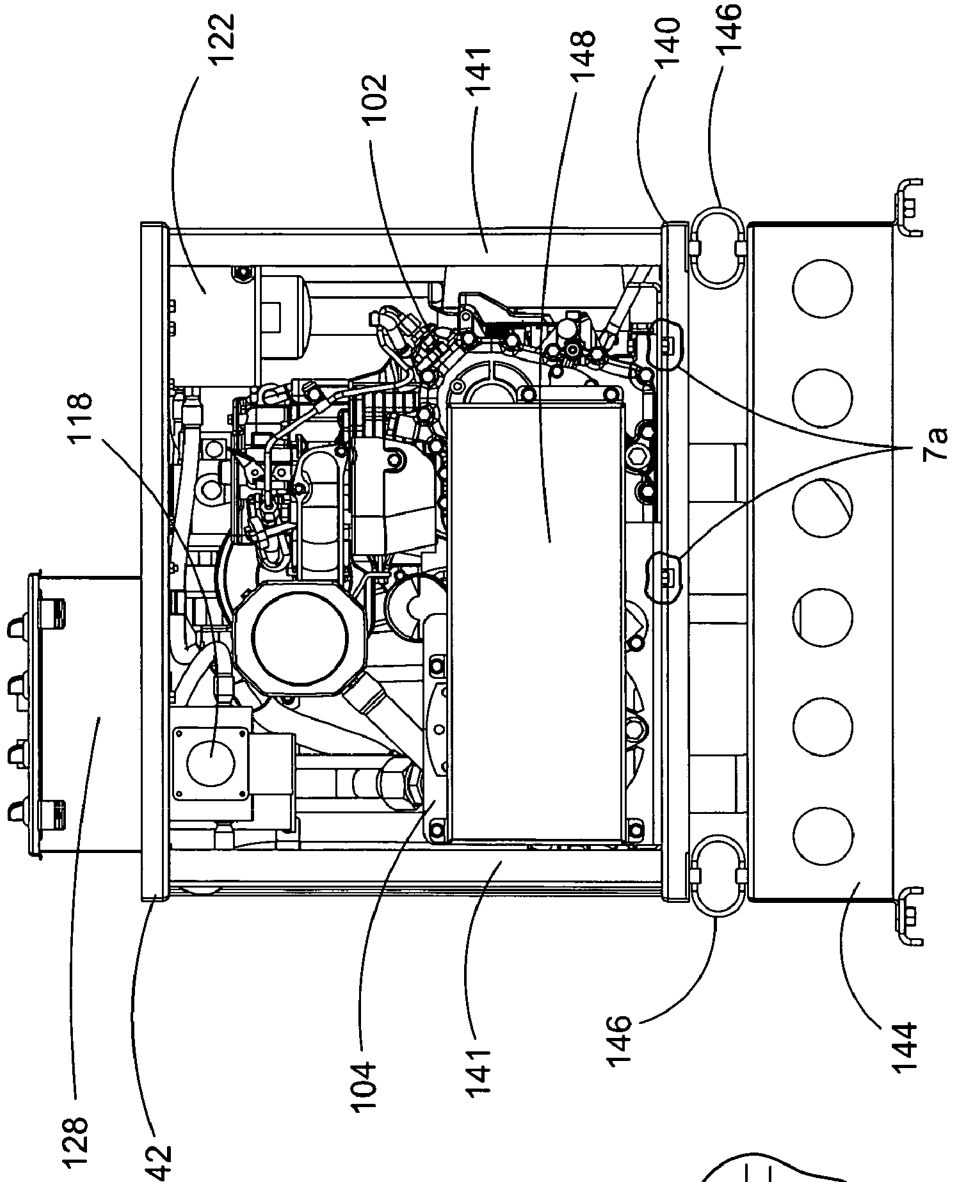
FIG. 7 is a front view of the engine warming system of FIG. 2.
Figure 7A:
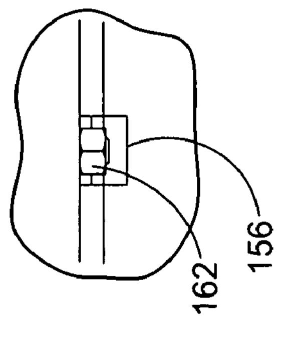
FIG. 7*a* is an enlarged view generally illustrating areas 7*a* circled in FIG. 7.

Specifically, it can be seen by examining FIGS. 7 and 7*a* that bolts 162 secure mounting plate 154 to auxiliary engine 102. Additionally, bolts 162 engage in slots 156 in base plate 142 to provide proper alignment of engine assembly 152 inside the engine warming system. Referring back to FIG. 6, the alignment of the engine assembly enables holes 158 in mounting plate 154 to quickly be co-axially aligned with holes 160 in base plate 142 so that bolts can be passed through the holes for securing the mounting plate to the base plate. Therefore, it should be appreciated that by removing engine assembly 152, an operator or mechanic can gain access to repair, replace, or perform other necessary maintenance on any of the components included in engine warming system 100. Once the repairs or other maintenance is performed, engine assembly 152 is simply guided back into place by slots 156 and secured to base plate 142 by bolts in holes 158 and 160. It should be appreciated that the bolts, as in the described and illustrated embodiment, are only one type of threaded, or otherwise detachable securing means known in the art, which should also be considered within the scope of the present invention.

Advantageously, the arrangement of the auxiliary fuel tank and the coolant heater greatly increase the ease of installation of system 100, facilitate repair and maintenance of the system, and simplify interface of the system with the locomotive engine. For example, auxiliary fuel tank 122 reduces the number of fuel line connections between tank 16 and the system. Specifically, only two such connections, for lines 121A and 121C, are needed, unlike the three or more connections needed in the prior art. That is, if no auxiliary fuel tank were included, one fuel line would be needed to enter a heater, one line to exit the heater, and one line to enter an auxiliary engine. Thus, fewer connections must be manipulated during installation or removal of the system. Further, any special fittings or adaptations needed for interfacing the primary fuel tank and system 100 can be limited to ports 123A (for the coolant heater) and 123B (for the auxiliary tank). That is, modifications to the locomotive are minimized.

Furthermore, the auxiliary tank configuration advantageously acts to isolate system 100 from the fuel system for the locomotive. For example, if the auxiliary engine must be replaced or repaired, the fuel and coolant lines for the locomotive do not have to be disturbed. That is, lines 121A and 121C can be disconnected from ports 123A and 123B, respectively, without requiring disturbing the "original" fuel lines, such as the lines between the primary tank and the primary engine. Alternately stated, the auxiliary engine draws fuel from the auxiliary fuel tank, not directly from the locomotive fuel tank. Therefore, the auxiliary engine can be removed entirely from the engine warming system without having to disturb the fuel lines connecting the engine warming system to the locomotive. Advantageously, this enables operators to perform maintenance without having to disturb the locomotive itself.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. An auxiliary engine warming system for a primary engine in a diesel locomotive comprising:

a modular engine assembly including an auxiliary diesel engine, the assembly displaceable as a unit from and to a frame for the engine warming system;

an auxiliary fuel tank including a fuel line detachably connected to the auxiliary engine and including a first fitting detachably connectable to a first fuel line for a primary fuel tank for the diesel locomotive;

a heater operatively connected to receive diesel fuel from said primary fuel tank and to dump excess diesel fuel to said auxiliary fuel tank, said heater operatively arranged to heat at least one fluid of said primary engine by burning said diesel fuel;

at least one temperature sensor interfacable with the diesel locomotive and arranged to monitor at least one temperature condition for the diesel locomotive; and, an emergency dialer for automatically dialing a preprogrammed number and transmitting an alert message in response to an alarm signal from the at least one temperature sensor.

2. The auxiliary engine warming system recited in claim 1 wherein the engine assembly includes a mounting plate, wherein the auxiliary engine is secured to the mounting plate, wherein the mounting plate is slidingly engagable with at least one slot in a frame of the auxiliary engine warming system for insertion into and removal from the frame, and wherein the plate is detachably fastened to the frame by a plurality of threaded fasteners.

3. The auxiliary engine warming system recited in claim 1 further comprising a vibration dampening means for reducing a transmission of vibrations from the auxiliary engine to the locomotive.

4. The auxiliary engine warming system recited in claim 1 wherein the engine assembly includes a generator mechanically coupled to an output of the auxiliary engine.

5. The auxiliary engine warming system recited in claim 1 wherein the heater includes a second fitting detachably connectable to a second fuel line for the primary fuel tank of the diesel locomotive.

6. The auxiliary engine warming system recited in claim 5 wherein the first and second fittings are the only fittings in the system connectable between the system and the fuel tank for the diesel locomotive.

7. The auxiliary engine warming system recited in claim 5 wherein the first and second fittings are the only fittings in the system necessary to supply fuel to the system.

8. The auxiliary engine warming system recited in claim 1 further comprising a controller connected to the at least one temperature sensor and the dialer and wherein the at least one sensor includes a coolant temperature sensor and oil temperature sensor.

9. An auxiliary engine warming system for a primary engine in a diesel locomotive comprising:

a modular engine assembly including an auxiliary diesel engine and a generator mounted to a plate, the assembly removable as a unit from a frame for the engine warming system via a slidable engagement between the plate and the frame and the plate detachably connected to the frame with a plurality of threaded fasteners;

an auxiliary fuel tank including a fuel line detachably connected to the auxiliary engine and including a first fitting detachably connectable to a first fuel line for a fuel tank for the diesel;

a coolant heater with a second fitting detachably connectable to a second fuel line for the fuel tank for the diesel;

a coolant temperature sensor interfacable with a cooling system for the diesel locomotive;

an oil temperature sensor interfacable with an oil system for the diesel locomotive;

a controller arranged to receive signals from the coolant and oil sensors; and, an emergency dialer arranged to receive signals from the controller and to automatically dial a preprogrammed number to transmit an alert message in response to an alarm signal from the coolant sensor or the oil sensor, wherein the first and second fittings are the only fittings in the system used to supply fuel to the system.

10. An auxiliary engine warming system for a primary engine in a diesel locomotive comprising:

an auxiliary diesel engine;

an electrical generator mechanically coupled to an output of the auxiliary engine;

a temperature sensor operatively arranged to measure a temperature of a coolant in the primary engine of the locomotive;

an emergency dialer for automatically dialing a preprogrammed number and transmitting an alert message when the temperature sensor measures a temperature below a minimum limit temperature of the coolant;

a mounting plate, wherein the auxiliary engine is secured to the mounting plate, wherein the mounting plate is operatively arranged to slidingly engage with at least one slot in a frame of the auxiliary engine warming system;

a vibration dampening means for reducing a transmission of vibrations from the auxiliary engine to the locomotive;

an auxiliary fuel tank arranged between a primary fuel tank of the locomotive and the auxiliary engine;

a coolant pump for pumping the coolant from the primary engine through the coolant heater, and a coolant heater for warming the coolant as the coolant is pumped through the coolant heater and back into the primary engine; and, an oil pump for circulating oil in an oil sump of the primary engine through the primary engine.

* * * * *